United States Patent

[11] 3,553,386

[72] Inventor John J. Golembeski North Plainfield, N.J.
[21] Appl. No. 745,144
[22] Filed July 16, 1968
[45] Patented Jan. 5, 1971
[73] Assignee Bell Telephone Laboratories, Incorporated Murray Hill, N.J. a corporation of New Jersey

[54] TELEPHONE SUBSCRIBER PAGING ARRANGEMENT

11 Claims, 9 Drawing Figs.

[52] U.S. Cl. 179/84, 179/1, 179/6
[51] Int. Cl. H04m 1/26
[50] Field of Search 179/84TR, 84A, 81B, 1HFT, 5P, 6(Inquired)

[56] References Cited

UNITED STATES PATENTS

| | | | |
|---|---|---|---|
| 2,951,910 | 9/1960 | Bauman | 179/84T |
| 3,041,411 | 6/1962 | Beatty | 179/81B |

*Primary Examiner*—Kathleen H. Claffy
*Assistant Examiner*—William A. Helvestine
*Attorneys*—R. J. Guenther and Edwin B. Cave

ABSTRACT: A telephone set equipped with a tone ringer includes an FM slope detector circuit and a following AM detector circuit. A difference amplifier receives outputs from a tone ringer signal amplifier and from the AM detector. The tone ringer thus serves a dual purpose as a ringer and as a speaker that is responsive to detected voice FM signals. The set may be employed for on-hook paging or emergency voice announcements.

INVENTOR
J. J. GOLEMBESKI
BY [signature]
ATTORNEY

TELEPHONE SUBSCRIBER PAGING ARRANGEMENT

BACKGROUND OF THE INVENTION

1. Field of the Invention

This invention relates to telephone ringing systems and more particularly to telephones employing tone responsive ringers.

2. Description of the Prior Art

The characteristic ring of a telephone bell is so deeply embedded as a "natrual" part of daily life and seems to serve so obvious a function that, insofar as it would appear from the prior art, little thought has been given to any real analysis of that function and how it might be better served.

It has long been recognized, nevertheless, that however effective it may be for its alerting purpose, the sound of a conventional telephone ringer is far from pleasing. More importantly, the high voltage and power requirements of conventional ringers are recognized disadvantages. For this reason low voltage, low power ringers have been developed that produce a somewhat musical tone in response to multifrequency ringing signals, the ringing frequencies being substantially higher than the conventional 20 Hertz signal but still within the voice frequency range.

Tone ringers, however pleasing to the ear, do nothing to increase the information delivered to the subscriber. From a telephone ring a subscriber is still informed only that someone is calling his number. No information is provided as to the nature of the call, as to whether a particular party is being called or as to whether an emergency of some type might exist. No matter how dire the emergency—whether fire or a civil defense warning for example—the subscriber may choose to ignore the ringing signal on the false assumption that it represents some unimportant, unwanted call. Unit the customer places the telephone set in an off-hook condition and listens to the receiver output, the nature and purpose of any particular call remain a mystery.

Accordingly one broad object of the invention is to increase the versatility of telephone ringing systems. Another object is to enhance the capability of a telephone as an emergency alerting device.

SUMMARY OF THE INVENTION

The above objects and related objects are achieved in accordance with the principles of the invention by employing a telephone set tone ringer as a dual function device, operable in the telephone on-hook condition either as a conventional tone sounder or as a speech signal transducer.

In one embodiment of the invention, the indicated dual function is achieved by providing parallel input paths to the tone ringer of a telephone set. The first path includes the usual tuned amplifier that is responsive only to those signals of preselected frequency or frequencies that characterize a tone ringing signal. the second path includes a linear FM detector circuit, that effects conversion from a frequency modulated signal to an amplitude modulated signal, in tandem with a conventional AM detector circuit. The output of the detector and the output of the tuned amplifier are both fed to a difference amplifier that drives the tone ringer transducer.

An arrangement in accordance with the invention affords the means for broadening substantially the function performed by a conventional tone ringer. For example, various emergency announcements can be made simultaneously to all subscribers in a given area or group. A voice message on an FM carrier may thus be employed for a number of different functions which may for example include announcing the presence of a fire in a hotel, announcing the existence of or an explanation of a widespread power failure or announcing an impending civil defense emergency. Additionally, an arrangement in accordance with the invention may be employed as a personal paging system. In each case the advantage gained is that an alerting signal in voice message form is transmitted to the subscriber while the telephone set is on-hook.

DESCRIPTION OF AN EMBODIMENT

Figure 1:
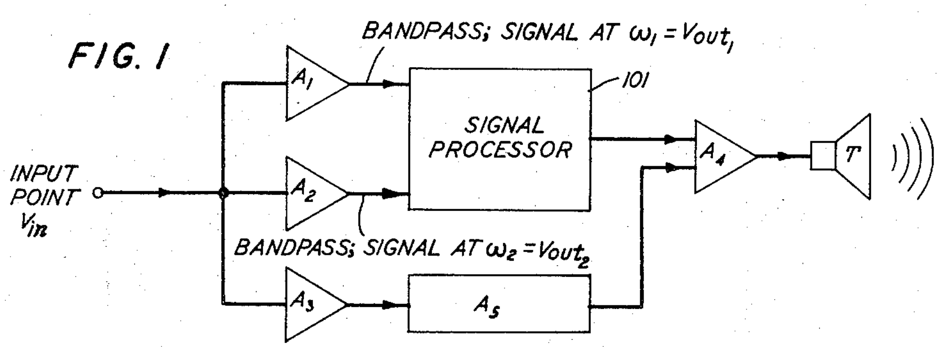
FIG. 1 is a block diagram of a telephone circuit in accordance with the invention.

The embodiment of the invention shown in block form in FIG. 1 includes a pair of parallel connected, band-pass amplifiers $A_1$ and $A_2$ which are employed conventionally for the tone signal detection of dual frequency tone ringing signals applied to the input point from the telephone line. The signal processor circuit 101 to which the outputs from the amplifiers $A_1$ and $A_2$ are applied may include a simple AND gate type of circuit which tests for coincident signals, and if coincidence is found, additional conventional circuitry is employed to generate a suitable ringing signal. In another form of the invention the signal processor circuit 101 may also include the combination of a relay and a voice recorder which has recorded thereon a suitable paging type of announcement. By AND gate circuitry, the operation of the relay and recorder is made responsive to the coincidence of output signals from the amplifiers $A_1$ and $A_2$. If this form of the invention is employed, the output from the signal processor 101 is an audio message signal rather than a ringing signal. In either event, amplifier $A_4$ amplifies the output from the signal processor 101 and applies it to a transducer T.

The principles of the invention contemplate that in the more usual case voice announcements will be sent over the telephone line by modulating an FM signal. The signal is then taken from an input point at the telephone set and applied to the input of an FM to AM conversion circuit $A_3$. The output from the circuit $A_3$ is then applied to an AM detector circuit $A_5$ and the resulting audio signal is applied as an input to a transducer-driving amplifier $A_4$. As indicated above, the transducer T is responsive to incoming signals from either the signal processor circuit 101 or from a detector $A_5$ when the telephone set is in the on-hook condition.

Figure 2:
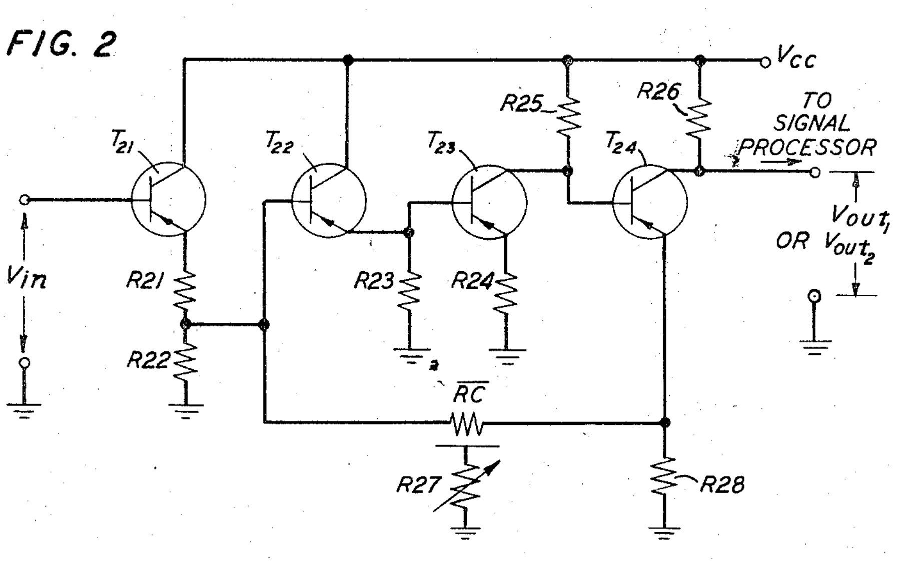
FIG. 2 is a schematic circuit diagram of one of the band-pass amplifiers shown in FIG. 1.

The band-pass amplifiers A1 and $A_2$ are identical except for the peak response frequency; an illustrative schematic circuit diagram of one of these amplifiers is shown in FIG. 2. The first stage of this circuit which includes a transistor $T_{21}$ and resistors R21 and R22 is a buffer amplifier which is designed to ensure a moderately high output impedance in order to avoid loading the distributed $\overline{RC}$ frequency selective network. The next stage, which is a unity voltage gain buffer stage with high input impedance, also to avoid loading the distributed $\overline{RC}$ network, includes a transistor $T_{22}$ and a resistor R23. The following intermediate stage, comprising the transistor $T_{23}$ and the resistors R24 and R25 provides gain and the final stage, a transistor $T_{24}$ and the resistors R26 and R28 is a buffer or output stage which applies the amplified signal to the signal processor circuit 101. The peak response frequency of the circuit may be varied by means of an adjustable resistor R27.

Figure 3:
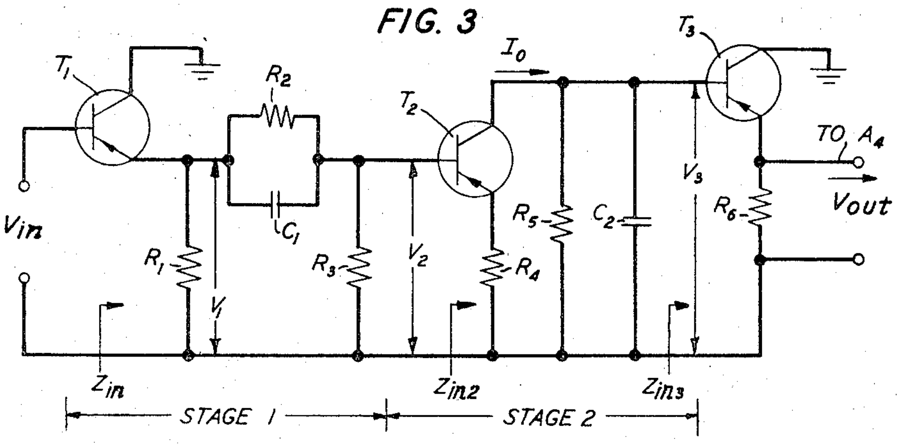
FIG. 3 is a schematic circuit diagram of the FM to AM conversion circuit shown in block form as $A_3$ in FIG. 1.
Figure 4:
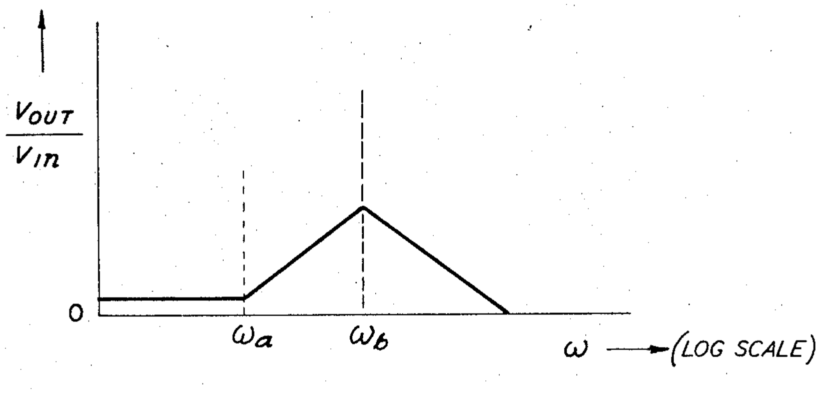
FIG. 4 is a plot of the ideal transfer function for the circuit shown in FIG. 3.

The FM-AM conversion circuit, shown in detailed schematic form in FIG. 3, ideally has a linear magnitude characteristic or transfer function in the range $\omega_a \leq \omega_b$ as shown in the transfer function plot of FIG. 4. The circuit of FIG. 3 thus acts as a slope detector converting the FM signal to an AM signal which, as described above, is then detected to provide the audio information. The incoming FM signal is preferably centered at $$\omega_o=\frac{1}{2}(\omega_b+\omega_o) \quad (1)$$

to help ensure low distortion. The narrow band FM signal $v(\omega)$ centered at $\omega_o$ is given by $$v(\omega)=V_o \cos(\omega_o t+\beta \sin \omega_m t) \quad (2)$$

where $\beta=\frac{\Delta\omega}{\omega_m}\ll\frac{\pi}{2}$ for the narrowband case and where $\omega_m$ is the modulating frequency. For small indices the spectrum of $v(\omega)$ is similar to an AM signal except that the sidebands at $\omega_b \pm \omega_m$ are in quadrature. This condition determines the system bandwidth and therefore the extent of the linear region of the plot shown in FIG. 4 between $\omega_a$ and $\omega_b$ which, in turn, provides for the slope detection of the FM signal.

Figure 5:
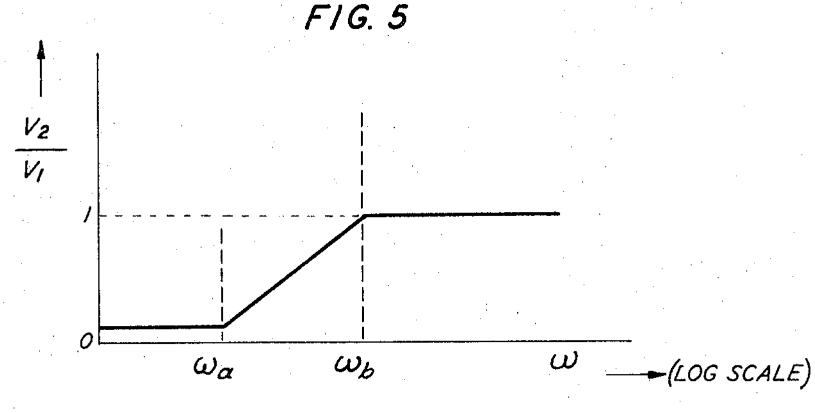
FIG. 5 is a plot of the transfer function of the first stage of the circuit shown in FIG 3.

The ideal transfer function described above is closely approached by the circuit of FIG. 3 as follows: The combination of a transistor -$T_1$ and a resistor $R_1$ realizes a low output impedance, unity gain amplifier. The magnitude of the resistor $R_1$ is relatively small so that a voltage source is approximated for feeding the succeeding stage which comprises the combination of a resistor $R_2$, a capacity $C_1$, and a shunt resistor $R_3$ in parallel with the input impedance of $T_2$. The transfer function of this stage may be defined as follows:

$$\frac{V_2}{V_1}=\frac{R'_3}{R'_3+R_2}\cdot\frac{SR_2C_1+1}{S\left(\frac{R_2R'_3}{R_2+R'_3}\right)C_1+1} \quad (3)$$

where $V_1$ and $V_2$ are the voltages indicated in FIG. 3, where S is the complex frequency variable, and where $R'_3$ is the parallel combination of the resistor $R_3$ and the impedance $Z_{in\,2}$. This transfer function is shown and plotted in FIG. 5.

The third section or stage of the circuit shown in FIG. 3 includes a transistor $T_2$, resistors $R_4$ and $R_5$ and a capacitor $C_2$. The purpose of this stage is to provide a controlled roll-off characteristic by causing the voltage transfer ratio to decrease for values of $\omega > \omega_b$ as opposed to an arbitrary one subject to transistor variations. The current $I_0$ at the collector of transistor $T_2$ is approximately equal to:

$$I_O\approx\frac{V_2}{R_4} \quad (4)$$

and the voltage $V_3$, measured as shown in FIG. 3 may be expressed as $$V_3=I_O\left[\frac{R'_5}{SR'_5C_2+1}\right] \quad (5)$$

where $R'_5$ is the parallel combination of the resistor $R_5$ and the impedance $Z_{in\,3}$. The transfer function may be defined as $$\frac{V_3}{V_2}\approx\frac{R'_5}{R_4[SR'_5C_2+1]} \quad (6)$$

Figure 6:
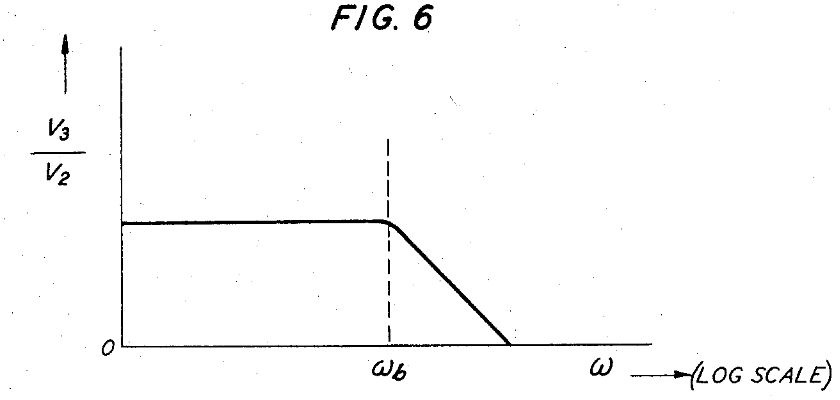
FIG. 6 is a plot of the transfer function of the third stage of the circuit shown in FIG. 3.

A plot of this transfer function is shown in FIG. 6.

Figure 7:
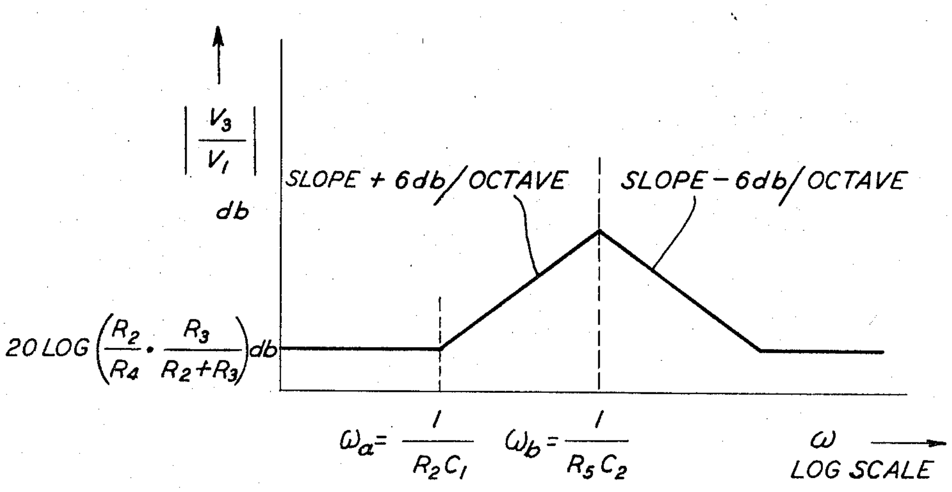
FIG. 7 is a plot of the combined transfer functions illustrated in FIGS. 5 and 6.

The composite characteristic or transfer function of the two stages of the circuit of FIG. 3 described immediately above are shown in FIG. 7, which also defines key points or values in terms of the circuit elements shown in FIG. 3.

Figure 8:
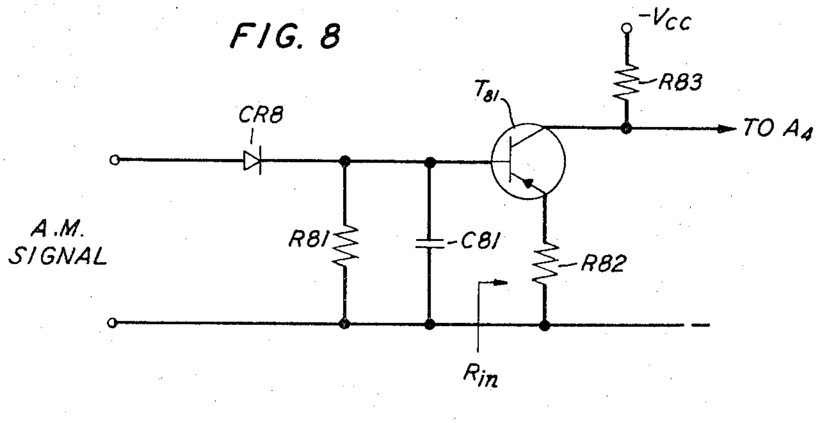
FIG. 8 is a schematic circuit diagram of the AM detector circuit shown in block form as $A_5$ in FIG. 1.

The block $A_5$ shown in FIG. 1 may take the form of a simple AM detector circuit of the type shown in FIG. 8. A diode CR8, a resistor R81 and a capacitor C81 perform the conventional detecting and filtering functions.

A transistor $T_{81}$ together with biasing resistors R82 and R83 and a biasing source $V_{cc}$ provide a buffer for the output stage. The time constant of the circuit should satisfy the inequality:

$$\frac{1}{R_{eq}.C81}\gg T_{max.}=\frac{1}{f_{max.}} \quad (7)$$

where $R_{eq}$ is the parallel combination of the resistor R81 and $R_{in}$ and where $f_{max}$ is the highest audio frequency component.

Figure 9:
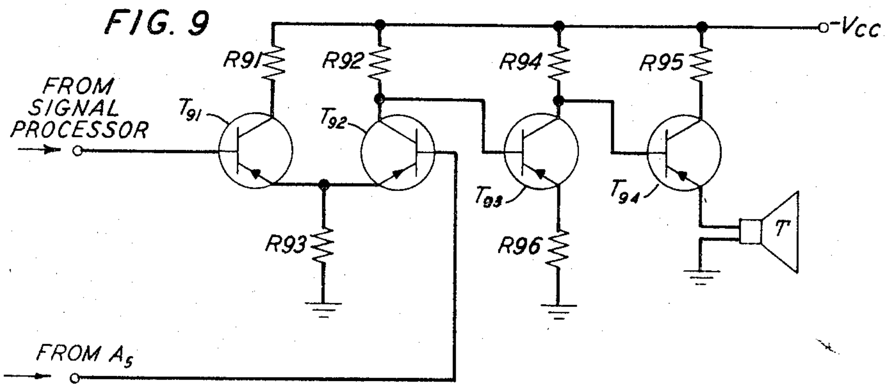
FIG. 9 is a schematic circuit diagram of the transducer driving amplifier shown in block form as $A_4$ in FIG. 1.

The transducer driving amplifier $A_4$ of FIG. 1, an illustrative form of which is shown in detailed schematic form in FIG. 9, may be termed a summer amplifier inasmuch as amplification is provided to a signal from the detector circuit $A_5$ applied to the base of transistor $T_{92}$, or to a signal from the signal processor circuit 101 applied to the base of transistor $T_{91}$, or to both. Resistors R91, R92 and R93 perform the usual biasing functions in addition to their signal processing role. The final stages comprising the transistors $T_{93}$ and $T_{94}$ together with the resistors R94, R95 and R96 provide straightforward amplification, and the output from the emitter of transistor $T_{94}$ is applied to drive the transducer T.

It is to be understood that the embodiment described herein is merely illustrative of the principles of the invention. Various modifications thereto may be effected by persons skilled in the art without departing from the spirit and scope of the invention.

I claim:

1. A ringing circuit for a telephone set comprising: in combination,
   - means including a transducer responsive to an oscillatory signal for generating an audible ringing tone;
   - means for detecting a frequency modulated voice signal; and
   - means for applying the output of said detecting means to said transducer, thereby to utilize said transducer as a loudspeaker for speech signals when said set is either in an on-hook or off-hook condition.

2. Apparatus in accordance with claim 1 wherein said responsive means includes a pair of parallel connected, band-pass amplifiers.

3. Apparatus in accordance with claim 2 wherein said detecting means is connected for operation independent of said amplifiers.

4. Apparatus in accordance with claim 2 wherein said detecting means comprises the tandem connected combination of an FM to AM conversion circuit and an AM detector circuit, said combination being connected in parallel relation with said amplifiers.

5. Apparatus in accordance with claim 2 wherein said responsive means further includes means responsive to coincident outputs from said amplifiers for generating an intermediate output signal and a transducer-driving amplifier circuit responsive to said intermediate output signal for applying an amplified signal to said transducer.

6. A telephone set comprising: in combination,
   - first means responsive to an oscillatory input signal applied to an input point for generating a first intermediate output signal;
   - recording-reproducer means having an audio message recorded thereon responsive to said first intermediate signal for generating an audio frequency signal corresponding to said message;
   - electroacoustic transducer means for translating said audio frequency signal to a corresponding acoustic signal; and
   - second means responsive to a voice modulated FM signal applied to said input point for driving said transducer.

7. Apparatus in accordance with claim 6 wherein said first means includes a plurality of parallel-connected, band-pass amplifiers each tuned to a respective peak frequency.

8. Apparatus in accordance with claim 7 wherein said second means comprises a circuit path in parallel relation with said amplifiers, said path including an FM to AM conversion circuit and an AM detector circuit in tandem relation.

9. A combination tone ringing audio announcement circuit for a telephone set comprising:
   - an input point for receiving either tone ringing signals or voice modulated signals from a telephone line;
   - an electroacoustic transducer;
   - first means for converting said ringing signals to first transducer driving signals;
   - second means for applying said first driving signals to said transducer;
   - third means for converting said voice modulated signals to second transducer driving signals;

fourth means for applying said second driving signals to said transducer;

said transducer operating as a tone ringer in response to said first driving signals and as a loudspeaker in response to said second driving signals; and wherein said first means includes a pair of parllel-connected, band-pass amplifiers, a signal generating circuit responsive to coincident outputs from said amplifiers for generating an output signal and a third amplifier circuit for applying said output signal to said transducer.

10. A combination tone ringing audio announcement circuit for a telephone set comprising:

an input point for receiving either tone ringing signals or voice modulated signals from a telephone line, an electroacoustic transducer;

first means for converting said ringing signals to first transducer driving signals;

second means for applying said first driving signals to said transducer;

third means for converting said voice modulated signals to second transducer driving signals;

fourth means for applying said second driving signals to said transducer;

said transducer operating as a tone ringer in response to said first driving signals and as a loudspeaker in response to said second driving signals; and wherein said third means comprises an FM-AM converting circuit in tandem relation with an AM detector circuit, said converting circuit and said detector circuit being connected in parallel relation with said first means.

11. A tone ringing circuit for a telephone set comprising: in combination;

an input point;

an electroacoustic transducer;

first means responsive to tone ringing signals applied to said input point from a telephone line for driving said transducer thereby to produce tone ringing;

second means responsive to voice modulated signals applied to said input point from said telephone line for driving said transducer thereby to produce an audible signal corresponding to said voice modulated signals; and said first and second means being operable when said telephone set is in either an on-hook or an off-hook condition.